(12) United States Patent
Lifson et al.

(10) Patent No.: US 6,925,823 B2
(45) Date of Patent: Aug. 9, 2005

(54) REFRIGERANT CYCLE WITH OPERATING RANGE EXTENSION

(75) Inventors: Alexander Lifson, Manlius, NY (US); Michael F. Taras, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 8 days.

(21) Appl. No.: 10/695,114

(22) Filed: Oct. 28, 2003

(65) Prior Publication Data

US 2005/0086957 A1    Apr. 28, 2005

(51) Int. Cl.[7] ............................................. F25B 49/02
(52) U.S. Cl. ...................... 62/196.3; 62/228.5; 417/32
(58) Field of Search ........................... 62/196.1, 196.2, 62/196.3, 228.4, 228.5; 417/18, 32, 44.1, 417/44.11

(56) References Cited

U.S. PATENT DOCUMENTS

| | | | | |
|---|---|---|---|---|
| 4,667,480 A | * | 5/1987 | Bessler ........................ 62/180 |
| 4,735,058 A | * | 4/1988 | Umezu et al. ............. 62/196.3 |
| 4,876,859 A | | 10/1989 | Kitamoto |
| 4,913,625 A | * | 4/1990 | Gerlowski ................... 417/18 |
| 5,463,874 A | * | 11/1995 | Farr ............................. 62/126 |
| 5,707,210 A | * | 1/1998 | Ramsey et al. ............... 417/32 |
| 5,875,637 A | | 3/1999 | Paetow |
| 5,941,689 A | * | 8/1999 | Skirde .......................... 417/32 |
| 6,047,556 A | | 4/2000 | Lifson |
| 6,099,259 A | * | 8/2000 | Monk et al. .................. 417/15 |
| 6,206,652 B1 | | 3/2001 | Caillat |
| 6,302,654 B1 | * | 10/2001 | Millet et al. .................. 417/63 |
| 6,393,850 B1 | * | 5/2002 | Vanderstraeten ........... 62/196.3 |
| 6,450,771 B1 | * | 9/2002 | Centers et al. ................ 417/12 |
| 6,619,062 B1 | * | 9/2003 | Shibamoto et al. ........ 62/228.3 |

OTHER PUBLICATIONS

Systems & Advance Technologies Engineering S.r.I., publication entitled "Compsys—Dynamic Simulation of Gas Compression Plants", dated Jun. 12, 2002.

Copeland Europe publication entitled "Refrigeration Scroll for Parallel Applications" dated Feb. 26, 2002.

* cited by examiner

*Primary Examiner*—William E. Tapolcai
(74) *Attorney, Agent, or Firm*—Carlson, Gaskey & Olds

(57) ABSTRACT

A refrigerant cycle is provided with a control that monitors system conditions such as current, voltage or temperature at a compressor motor or refrigerant state conditions at compressor ports. A protection switch on the motor is operable to stop operation of the compressor should a system condition exceed a predetermined maximum. The control monitors a system condition, and determines that the system condition indicates the protection switch may be actuated as the condition is moving toward the predetermined limit. Under such conditions, the control moves the compressor to a less loaded mode of operation such that it is less likely that the protection switch will actuate.

20 Claims, 1 Drawing Sheet

REFRIGERANT CYCLE WITH OPERATING RANGE EXTENSION

BACKGROUND OF THE INVENTION

This invention relates to a concept that monitors system conditions in a refrigerant cycle, and reduces the compressor load should those conditions approach an extreme condition, in order to prevent system nuisance shutdowns and complete loss of cooling load by end users.

Refrigerant cycles are utilized for HVAC systems, refrigeration units, and various other applications. In conventional refrigerant cycles, a compressor compresses a refrigerant and delivers that refrigerant to a condenser. From the condenser, the refrigerant travels to an expansion device, and from the expansion device, to an evaporator. From the evaporator, the refrigerant is returned to the compressor.

One recent development in the refrigerant cycle art is the inclusion of an economizer cycle. In an economizer cycle, a portion of the refrigerant downstream of the condenser is tapped off and passed through an economizer expansion device, and then into an economizer heat exchanger. The main refrigerant flow from the condenser also passes through the same economizer heat exchanger, preferably in a counter-flow arrangement. In the economizer heat exchanger, the tapped flow cools the main refrigerant flow. In this manner, a greater cooling capacity is provided by the main refrigerant flow. Downstream of the economizer heat exchanger, the tapped refrigerant is returned to the economizer port of the compressor.

Motors for compressors in a refrigerant cycle are often provided with a shut-off protection device. These shut-off protection devices can shut down the motor of the compressor should an excessive current be experienced. Moreover, if motor temperature becomes too high, the protection device may also open, shutting down the motor.

In many extreme load situations, such as when the ambient temperature is high, and line voltage is low, the condition may cause the protection device switch to actuate, and stop the motor. Of course, the conditions when the ambient temperature is high would not be a good time for the refrigerant cycle to be shut down, since at such conditions cooling load is needed and desired the most by end users. As such, one time when the protection switch is quite likely to stop operation of the motor, is also a time when it would be the least desirable.

One challenge for a refrigerant cycle designer, and in particular for the compressor designer, is to keep the overall size of the compressor housing small. At the same time, a motor for the compressor must be sufficiently large to be able to drive the compressor at the extreme load conditions mentioned above.

SUMMARY OF THE INVENTION

In the disclosed embodiment of this invention, conditions in a refrigerant cycle are monitored. If those conditions approach an extreme operating point that might soon result in the actuation of a protection switch, then a control for the refrigerant cycle anticipates it and unloads the compressor to prevent system shutdown. As an example, if the refrigerant cycle includes an economizer branch, and if a control senses that the compressor motor is approaching an extreme operating point, the control may switch the refrigerant cycle to non-economized mode. In a refrigerant cycle without an economizer mode, or while the refrigerant cycle is in non-economized operation and the load is still not sufficiently reduced, then the bypass unloader valve may be opened to further reduce compressor load.

Further, if the electric motor for driving a compressor is a multi-speed or variable speed motor, a motor control may slow the speed of operation of the motor to also reduce the load. Notably, for purposes of the claims in this application, the term "variable speed motor" should be understood to mean either a multi-speed motor having several discrete speeds, or an infinitely variable speed motor. That is, either type motor would be useful for this invention, and will be referred to generically as a "variable speed" motor. Additionally, other known methods such as cylinder unloading, slide valves, suction port restriction, etc. can be utilized for the same purpose for various types of compressors. All of these control steps could result in the refrigerant cycle being at a capacity that is less than what may be in demand or desirable for the particular environmental conditions. However, by reducing the capacity, and thus the load, the compressor may avoid a shutdown that would otherwise occur. As such, overall, a more desirable result occurs, even though the refrigerant cycle may be operating at a less than otherwise desired capacity.

In a preferred embodiment, the refrigerant cycle incorporates a scroll compressor. However, other compressor types such as screw compressors, reciprocating piston compressors, etc., would benefit from this invention.

These and other features of the present invention can be best understood from the following specification and drawings, the following of which is a brief description.

DETAILED DESCRIPTION OF THE PREFERRED EMBODIMENT

Figure 1:
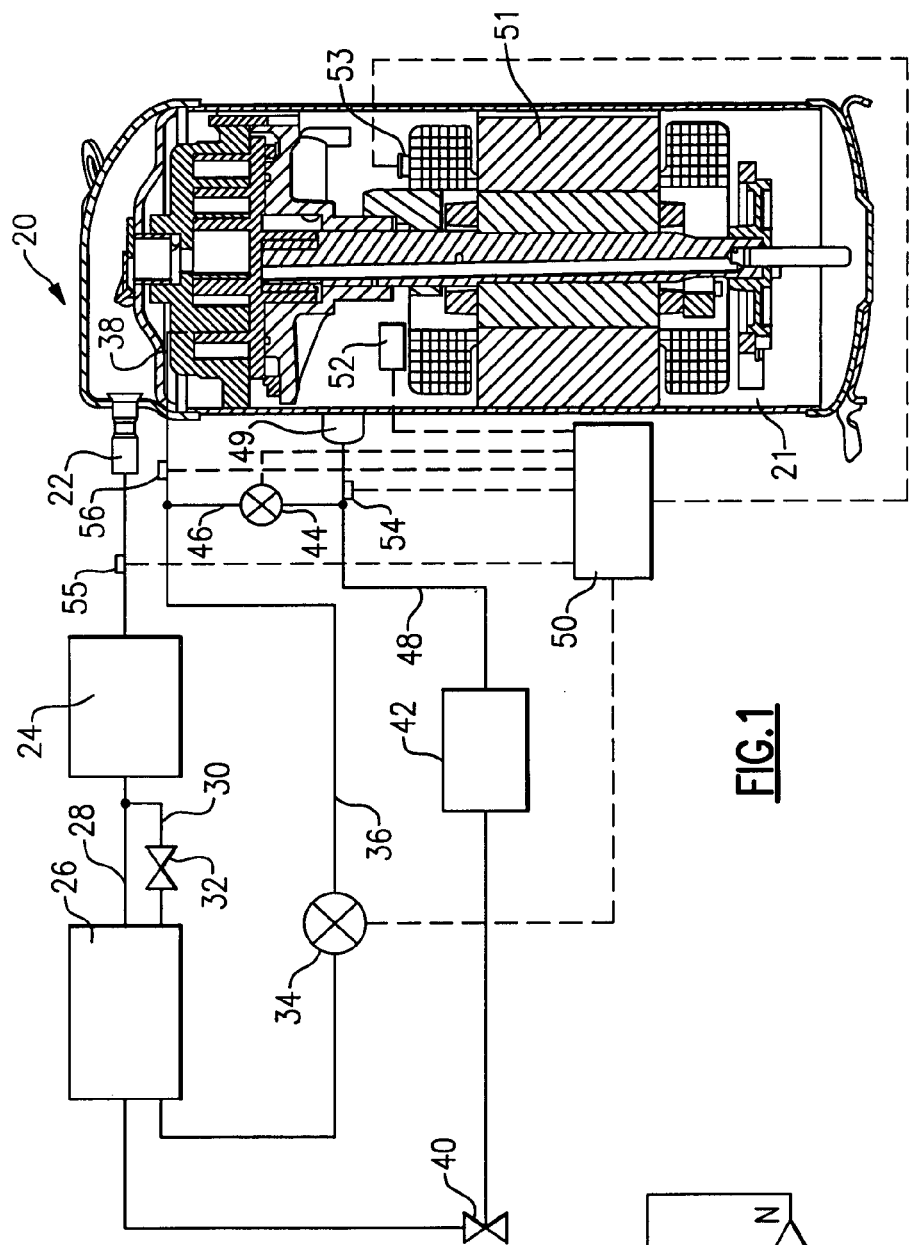
FIG. 1 is a schematic view of a refrigerant cycle incorporating the present invention.

FIG. 1 shows a refrigerant cycle 20 having a compressor 21 delivering a refrigerant to an outlet port 22. From outlet port 22, the refrigerant travels to a condenser 24. As known, in condenser 24, the refrigerant exchanges heat with a source of outside air.

Downstream of condenser 24 is an economizer heat exchanger 26. A main refrigerant flow line 28 delivers refrigerant from the condenser 24 to a first branch of the economizer heat exchanger 26. A line 30 taps a portion of the refrigerant from the main refrigerant line 28 and passes this tapped refrigerant through an economizer expansion device 32. Now, the refrigerant in the tapped line 30 is cooler than the refrigerant remaining in the line 28. In the economizer heat exchanger 26, the tapped refrigerant subcools the main refrigerant in line 28. The tapped refrigerant is returned through a shut-off valve 34 in line 36, to an intermediate compression point 38 in the compressor 21.

As shown, the compressor 21 is a scroll compressor, and the injection of the returned economizer fluid, as known, may be at a location intermediate to the compression cycle between suction and discharge.

The main refrigerant flow from the economizer heat exchanger 26 moves through a main expansion device 40, and to an evaporator 42. As known, in evaporator 42, the refrigerant exchanges heat with an air source to be cooled. Suction line 48 connects evaporator 42 with a compressor suction tube 49.

An unloader bypass valve 44 is placed on a bypass line 46 connecting the suction line 48 and economizer return line 36. As known, when the unloader valve 44 is open, and the economizer valve 34 is shut, refrigerant can be returned from the intermediate port 38 to the suction line 48. Of course, other locations for unloader valves are known. Additionally, the bypass unloader valve 44 and economizer shutoff valve 34 can be opened at the same time presenting an extra step of unloading.

Further, while a compressor 21 is shown as a scroll compressor, other compressor types will benefit from the following teachings of this invention. In particular, a screw compressor typically has a slide unloader valve. A reciprocating piston compressor may have various forms of cylinder-mounted unloader valves. All of these compressor types will benefit from the various teachings of the invention, as follows.

Within the compressor is a motor 51 and a motor protection device 53. As known, the motor protection device typically includes a protection switch that opens should the temperature at the motor exceed a predetermined maximum, or should the current exceed a predetermined maximum or should the combination of current and temperature exceed a certain value. Additionally, current or power sensing means (e.g., electronic boards) can be employed to detect compressor motor overload conditions. That is, the protection switch 53 is operable to shut down the motor 51 to protect the compressor 21 should some extreme operating condition be sensed.

The shut-off of the motor 51 by the protection switch 53 is undesirable. In particular, a shutdown is often most likely to occur when the load on the refrigerant cycle is at its greatest. As an example, should there be a very high ambient temperature in the environment surrounding the refrigerant system 20 and/or line voltage drops below its nominal level, then the load to cool the indoor air stream in the evaporator 42 is at its greatest. Under such conditions, the current, power and temperature of the motor 51 would also be expected to be at a high level. Under such conditions, any one of the current power or temperature would be more likely to exceed the maximum than under lower load conditions. However, as mentioned above, this would also be an inopportune time for the motor 51 to be stopped, since the entire cooling load is lost by end users.

Thus, the present invention includes a method that monitors system conditions and reduces the load on the compressor if system conditions are approaching the limits of the protection switch 53. As an example, a control 50 may receive feedback from a sensor 52 of the current, power (at certain line voltage) or temperature at motor 51. If any of those conditions are approaching the limits of the protection switch 53, then the control 50 may move the refrigerant cycle 20 to an unloaded operation. As an example, the economizer valve 34 is typically open at the highest system capacity. The control 50 may close the valve 34, stopping economizer operations should the conditions indicate the compressor is approaching a limit. In this way, the load on the compressor 21 would be reduced, and the motor current, power or temperature at those system conditions would also be reduced, reducing the likelihood that the protection switch 53 would be actuated.

As a second step, or in a system that does not include an economizer cycle, the unloader bypass valve 44 may be opened. In this way, the amount of refrigerant being compressed is reduced, and the load on the compressor 21 is reduced. Under such conditions, the system load would also likely be reduced (due to reduction of refrigerant pressure in condenser and evaporator), and would move further away from the extreme limit that would actuate the protection switch 53. Further, under some conditions, if merely shutting off the economizer valve 34 is not sufficient to reduce the system condition, then the unloader valve 44 could also be opened. An additional step of unloading can be achieved when both economizer shutoff valve 34 and unloader bypass valve 44 are open.

The FIG. 1 schematic also shows two additional features. First, the control 50 may be utilized to control the speed of the motor 51, if the motor 51 is a multi-speed or variable speed motor. Under such conditions, if the system conditions are approaching the maximum range for the protection switch 53, then the speed of the motor 51 may be reduced, reducing load.

Further, rather than monitoring compressor motor parameters such as power, current or temperature, sensor 54 could monitor the pressure and temperature of the refrigerant entering the suction tube 49 and sensor 55 could monitor pressure leaving discharge tube 22. A worker of ordinary skill in the art would recognize how to utilize the suction pressure and temperature and discharge pressure to predict the load on the compressor, and would thus be able to determine whether the load was approaching a condition that might result in the switch 53 being actuated. If so, then one of the various control strategies as mentioned above may be executed. It should be understood that in order to determine compressor power in an economized mode of operation, additional pressure and temperature sensor 56 would desirably be located on the economizer line 36 at or near the economizer compressor port. In all cases, when power is used as a decision parameter, reference line voltage is preferably measured as well. The compressor discharge port temperature can be utilized instead to determine the motor trip conditions.

While the "system conditions" have been described with reference to the motor or refrigerant states at compressor suction, economizer and discharge ports, there are also well known alternative ways of determining an undesirable condition within the compressor at locations elsewhere within the compressor shell. The present invention relates to any sensors of a "system condition" and all locations and condition types. Examples include motor temperature, oil sump temperature, motor current, motor power, discharge temperature, suction pressure, discharge pressure, economizer pressure, economizer temperature, operating voltage, ambient temperature, economizer pressure or economizer temperature.

Figure 2:
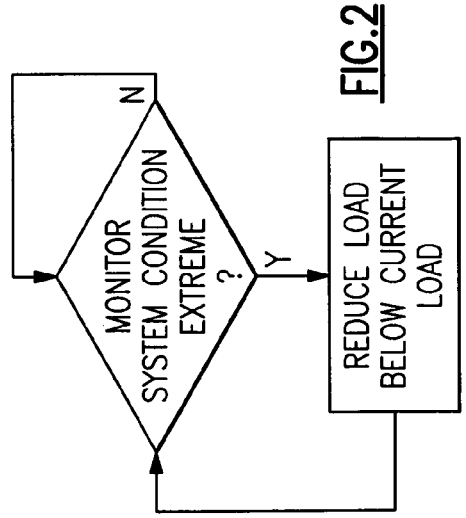
FIG. 2 is a simple flowchart of the present invention.

Generally, and as shown in FIG. 2, the refrigerant cycle 20 incorporates a control 50 that continues to monitor at least one system parameter. If that system parameter is approaching an extreme value, then there is a control step taken to reduce the load below the current load value. As an example, the economizer cycle may be stopped, the compressor may be unloaded, the motor speed may be slowed, etc.

The present invention thus provides the ability to continue to provide some cooling capacity at times when the prior systems would have stopped compressor operation. Thus, in a sense, the refrigerant system could be seen as providing the maximum possible capacity while still maintaining operation of the refrigerant system.

Moreover, since the present invention has a control that will ensure that undue load will not be placed upon the motor for a prolonged period of time, in many cases a smaller motor may be utilized in the design of the compressor 21. Alternatively, a larger pump unit size may be included into the same size compressor housing shell matching the same motor size. This would provide greater freedom to the compressor designer in providing increased capacity for the compressor pump unit.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A compressor comprising:
   a compressor pump unit, said compressor pump unit driven by a motor;
   a protection device associated with said motor, said protection device operable to stop operation of said motor should a first system condition reach a predetermined level; and
   a control for said compressor, said control monitoring a second system condition, and identifying when said second system condition indicates said first system condition is approaching said predetermined level, said control being operable to reduce a load on said compressor as said first system condition approaches said predetermined level.

2. A compressor as set forth in claim 1, wherein said control is operable to open an unloader valve on said compressor should said first system conditions approach said predetermined level.

3. A compressor as set forth in claim 1, wherein said control is operable to close an economizer valve on said compressor should said first system conditions approach said predetermined level.

4. A compressor as set forth in claim 1, wherein said motor is a variable speed motor, and said control being operable to slow a compressor motor speed should said first system condition approach said predetermined level.

5. A compressor as set forth in claim 1, wherein said second system conditions are at least one of the motor temperature, oil sump temperature, motor current, motor power, discharge temperature, suction pressure, discharge pressure, operating voltage, ambient temperature, economizer pressure or economizer temperature.

6. A compressor as set forth in claim 1, wherein at least one of said first and at least one of said second system conditions are the same.

7. A refrigerant cycle comprising:
   a compressor having a compressor pump unit and a motor for driving said compressor pump unit, said motor being provided with a protection device operable to stop operation of said motor should a first system condition exceed a predetermined level;
   a condenser downstream of said compressor;
   an expansion device downstream of said condenser;
   an evaporator downstream of said expansion device; and
   a control for controlling at least said compressor, said control being operable to sense a second system condition and move said refrigerant cycle to a less loaded operation should said monitored second system condition indicate said first system condition may be approaching said predetermined level.

8. A refrigerant cycle as set forth in claim 7, wherein said control actuates an unloader valve for unloading said compressor pump unit and returning a compressed refrigerant back to a suction line when said monitored second system condition indicate said first system condition may be approaching said predetermined level.

9. A refrigerant cycle as set forth in claim 7, wherein said refrigerant cycle further includes an economizer cycle between said condenser and said expansion device, said economizer cycle being provided with a shut-off valve, and said control stopping operation of said economizer unit by closing said shut-off valve should said monitored second system condition indicate said first system condition may be approaching said predetermined level.

10. A refrigerant cycle as set forth in claim 7, wherein said refrigerant cycle further includes an economizer cycle between said condenser and said expansion device, said economizer cycle being provided with a shut-off valve, and said control stopping operation of said economizer unit by closing said shut-off valve should said monitored second system condition indicate said first system condition may be approaching said predetermined level, having both economizer shutoff valve and unloader bypass valve open.

11. A refrigerant cycle as set forth in claim 7, wherein said motor is a variable speed motor, and said control being operable to slow a compressor motor speed should said system conditions said monitored second system condition indicate said first system condition may be approaching said predetermined level.

12. A refrigerant cycle as set forth in claim 7, wherein said second system condition is at least one of the motor temperature, oil sump temperature, motor current, motor power, discharge temperature, suction pressure, discharge pressure, operating voltage, ambient temperature, economizer pressure or economizer temperature, and said control being operable to determine said first system condition approaching said undesirable level by monitoring said at least one of said motor temperature, oil sump temperature, motor current, motor power, discharge temperature, suction pressure, discharge pressure, operating voltage, ambient temperature, economizer pressure or economizer temperature.

13. A refrigerant cycle as set forth in claim 7, wherein said first and second system conditions are the same condition.

14. A method of operating a refrigerant cycle comprising the steps of:
    (1) monitoring a first system condition on a compressor, and providing a motor for said compressor with a shut-off switch, said shut-off switch being operable to stop operation of said compressor motor should said first system condition exceed a predetermined maximum;
    (2) monitoring a second system condition and determining when said second system condition indicates said first system condition is approaching said predetermined maximum, and moving said refrigerant cycle to a lower capacity mode of operation.

15. The method of claim 14, wherein said shut-off switch is attached with a housing that also encloses said motor.

16. The method of claim 15, wherein said shut-off switch is within said housing.

17. A refrigerant cycle as set forth in claim 7, wherein said compressor including a housing enclosing said motor, and said protection device being attached to said housing.

18. A refrigerant cycle as set forth in claim 17, wherein said protection device is within said housing.

19. A compressor as set forth in claim 1, wherein a housing enclosing said motor, and said protection device being attached to said housing.

20. A compressor as set forth in claim 19, wherein said protection device is within said housing.

* * * * *